United States Patent [19]

Paavonen

[11] Patent Number: 5,697,058
[45] Date of Patent: Dec. 9, 1997

[54] CALL SET-UP IN A TRANSMISSION TRUNKING RADIO SYSTEM

[75] Inventor: Tapio Paavonen, Saarijärvi, Finland

[73] Assignee: Nokia Telecommunications Oy, Espoo, Finland

[21] Appl. No.: 446,635

[22] PCT Filed: Nov. 26, 1993

[86] PCT No.: PCT/FI93/00500

§ 371 Date: May 25, 1995

§ 102(e) Date: May 25, 1995

[87] PCT Pub. No.: WO94/13110

PCT Pub. Date: Jun. 9, 1994

[30] Foreign Application Priority Data

Nov. 27, 1992 [FI] Finland ............. 925430

[51] Int. Cl.[6] .......................................... H04Q 7/38
[52] U.S. Cl. ................. 455/34.1; 455/54.2; 455/63
[58] Field of Search ..................... 455/34.1, 34.2, 455/54.1, 54.2, 67.1, 63; 370/17, 85.3, 85.2

[56] References Cited

U.S. PATENT DOCUMENTS

| | | |
|---|---|---|
| 4,012,597 | 3/1977 | Lynk, Jr. et al. . |
| 4,612,415 | 9/1986 | Zdunek et al. . |
| 4,939,746 | 7/1990 | Childress . |
| 5,239,674 | 8/1993 | Comroe et al. ............... 455/54.1 |
| 5,355,516 | 10/1994 | Herold et al. ............... 455/54.2 |
| 5,383,185 | 1/1995 | Armbruster et al. ............... 370/85.3 |

OTHER PUBLICATIONS

Zdunek: "Design Considerations for Trunked Radio Systems", IEEE, 455, 194–201, 1986, see pp. 194–195.

Primary Examiner—Edward F. Urban
Attorney, Agent, or Firm—Cushman Darby & Cushman Intellectual Property Group of Pillsbury Madison & Sutro LLP

[57] ABSTRACT

A call control method in a transmission trunking radio system, in which (i) M traffic channels are simultaneously allocated to at most N mobile stations for a call, N and M being positive integers and N>M; and (ii) a mobile station is commanded to go onto one of the M traffic channels during a call for the duration of the call transactions only and onto a control channel at other times. The number N of calls can be optimized by (iii) collecting data about collisions of call transactions of different calls on the M traffic channels, and (iv) automatically adjusting the maximum number N of simultaneously allowed calls in accordance with the collected data.

10 Claims, 3 Drawing Sheets

CALL SET-UP IN A TRANSMISSION TRUNKING RADIO SYSTEM

FIELD OF THE INVENTION

The invention relates to a call control method in a transmission trunking radio system.

BACKGROUND OF THE INVENTION

In a trunking radio system, several user groups, even several user organizations, share a common pool of channels. In radio systems like this, a message trunking procedure is usually utilized for call set-up. In this procedure a traffic channel is permanently allocated for one call for the entire duration of the call. The call may consist of various separate call transactions (several pressel activations by separate terminals). The channel is not de-allocated (released) until the call is explicitly terminated or a specific timer expires.

In a transmission trunking procedure, a group of simultaneous calls shares a certain group of traffic channels; for each call, a traffic channel belonging to this group is allocated, separately for each call transaction (each activation of the pressel). The traffic channel is immediately de-allocated at the end of the call transaction, i.e. when the pressel is released and one stops speaking. Between the call transactions, the MS participating in the call goes to listen onto a control channel. It is typical of transmission trunking that allocation of a channel requires only a little signalling during an on-going call.

On account of transmission trunking, for example, more than four calls can, in principle, be allowed simultaneously in a 4-channel system. However, there is no guarantee that a subscriber can be served at the precise moment the service is requested for. Another problem with optimisation of channel utilization is that it is not necessarily possible to make a reliable estimate of the number of calls that can be allowed simultaneously on transmission trunking channels since the amount of traffic may vary from day to day. For example, a very large number of calls by which subscribers give brief instructions to one another relatively seldom (e.g. group call) can be allowed simultaneously. On the other hand, one call with normal conversation occupies an entire traffic channel for a long time.

SUMMARY OF THE INVENTION

An object of the present invention is to optimise the number of simultaneous calls in a transmission trunking radio system.

This is achieved according to the invention with a call control method in a transmission trunking radio system, in which M traffic channels are simultaneously allocated to at most N mobile stations for a call, N and M being positive integers and N>M; and during a call a mobile station is commanded to go onto one of the M traffic channels for the duration of the call transactions only and to go onto a control channel at other times. The method is characterised by collecting data about collisions of call transactions of different calls on said M traffic channels, and automatically adjusting the maximum number N of simultaneously allowable calls in accordance with the collected data.

The invention offers a solution to the problem of optimising the number of calls: the radio system collects collision data about call transactions of different calls, e.g. at a base station or a mobile exchange. On the basis of these traffic and collision data the radio system automatically controls the number of simultaneous calls, increasing the number if no collisions occur and reducing it on certain conditions if collisions occur. It is thus possible to establish several simultaneous calls if traffic is such that the probability of collision is small.

A requirement for collection of collision data is that it is possible to make a relatively reliable estimate of an occurrence of a collision. In one embodiment of the invention, a mobile station sends a channel request to a base station for each service transaction. Each situation where the system is not capable of immediately allocating a traffic channel because no free channels are available is then interpreted as a collision of call transactions.

The maximum number of simultaneous calls can be adaptively adjusted on the basis of the number and frequency of collisions. The adaptation may depend e.g. on the ratio of such channel allocation attempts which have caused collisions to the total number of allocation attempts in a time unit.

The invention also relates to a transmission trunking radio system comprising base station sites (BS), mobile stations (MS), call control means (MX) and, in at least one base station site, at least one control channel and at least M traffic channels in which at most N simultaneous calls are allowed, N and M being positive integers and N>M; the call control means (MX) commanding the mobile station to go onto one of the M traffic channels during a call for the duration of the call transactions and onto a control channel at other times. The system of the invention is characterized in that it further comprises means (MX) for collecting data about collisions of call transactions of different calls on said M traffic channels, and means (MX) for automatically adjusting the maximum number N of simultaneously allowable calls in accordance with the collected data.

BRIEF DESCRIPTION OF THE DRAWINGS

In the following the preferred embodiments of the invention will be described in greater detail with reference to the attached drawings, in which.

DETAILED DESCRIPTION OF PREFERRED EMBODIMENTS OF THE INVENTION

Figure 1:
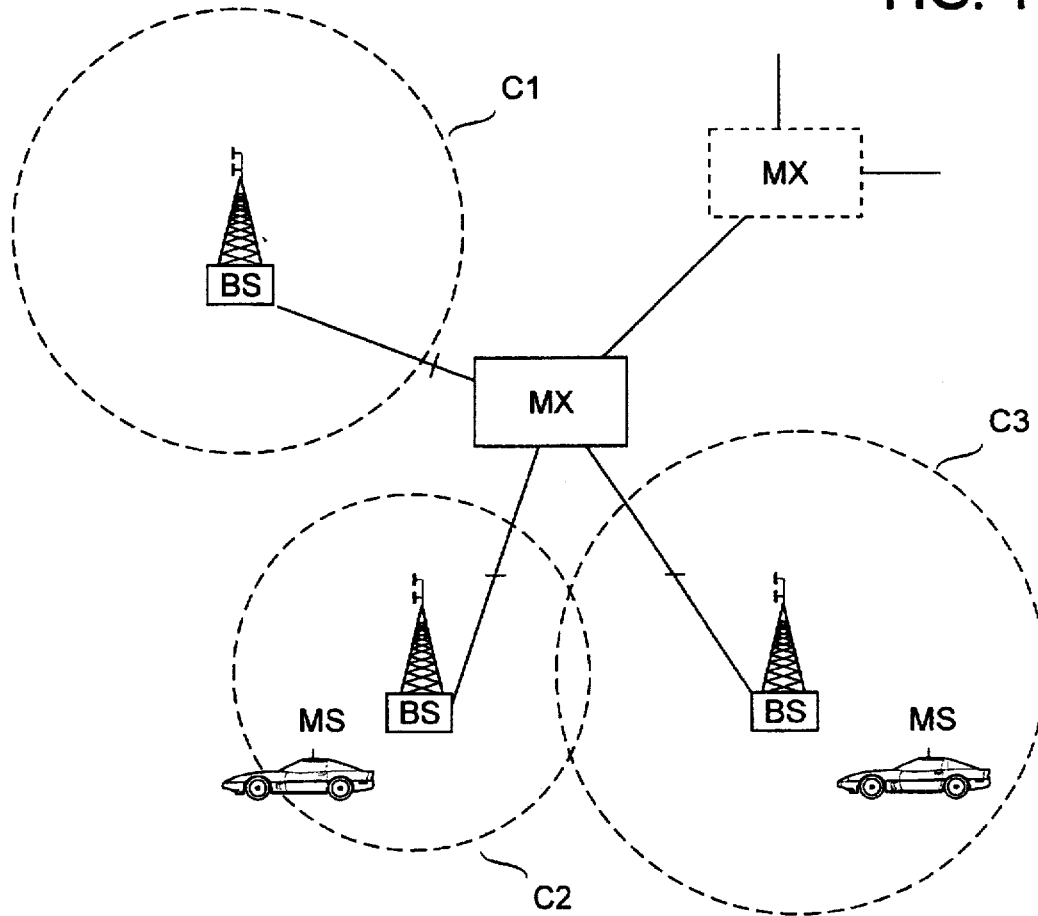
FIG. 1 illustrates a radio system in which the invention may be applied.

FIG. 1 shows a trunking radio telephone system in which the geographical area covered by the system is divided into smaller radio areas or cells C1, C2 and C3, which may be separate, defined by one another or overlap in their peripheral areas. Each cell C1, C2, C3 contains at least one fixed—typically multichannel—transceiver apparatus BS, which is called a base station. All base stations BS are connected by fixed transmission links, such as cables, to a mobile exchange MX, which controls the operation of the base stations BS. The base stations BS communicate via a radio connection with subscriber mobile stations MS roaming freely within the radio system on the radio frequencies or channels assigned to the radio system.

A trunking radio telephone system may be a digital TDMA system or an analog FDMA system. The analog FDMA system may be e.g. of the type described in Finnish Patent Application 914,654. In an analog FDMA system each radio channel serves as a traffic channel or a control channel. A control channel is a channel on which signalling for controlling the system is transmitted. A traffic channel is a channel on which speech or data are transmitted. In a TDMA system each radio channel is further divided into timeslots (e.g. 4 or 8 timeslots per radio channel), in which control and traffic channels are conveyed.

In radio systems, a so called message trunking principle is normally used for call set-up: a traffic channel is allocated for one call for the complete duration of the call. The number of simultaneous calls is thus limited to the number of traffic channels.

A call is complete information exchange between two or more parties. A call may be made up of one or more call transactions. In a semi-duplex call these transactions are sequential. A call transaction refers generally to all of the functions associated with complete unidirectional transmission of information during a call.

The invention relates to a trunking radio system in which a so called transmission trunking procedure is utilized at least on some traffic channels. The number of simultaneous calls may exceed the number of traffic channels available, a traffic channel being allocated separately for each call transaction (each activation of the pressel). A traffic channel is deallocated immediately at the end of the call transaction, i.e. as the pressel is released and one stops speaking. During the interval between call transactions a mobile station participating in the call goes onto a control channel. One application of this is known as quasi-transmission trunking, which is otherwise similar to conventional transmission trunking but channel deallocation is delayed for a short period at the end of the call transaction (after the pressel release). During this 'hang-time' the channel allocation may be re-used for a new call transaction that is part of the same call.

In the following the transmission trunking principle will be described with reference to FIG. 3. In this embodiment it is assumed that a call is established between two mobile stations MSA and MSB located within the area of one base station. The MSA and MSB listen on a control channel, ready to go, if necessary, for the duration of call transactions onto the M traffic channels available, M being e.g. 4. When the MSB user wants to speak, he activates the pressel, whereby the MSB sends a request-to-transmit message U TX DEMAND on a control channel to the base station BS. The base station BS forwards the message to the mobile exchange MX. The MX comprises a call control computer, which allocates free traffic channels to the calling parties and sends a permission-to-transmit message D TX GRANTED through the base station BS to the MSB, and a D CONTINUE message to the other calling party MSA, thereby announcing the call transaction to be performed. Each message also contains channel allocation, which commands the mobile stations MSA and MSB to the traffic channels allocated to them. The MSA and MSB then go onto the traffic channels allocated, and the MSB initiates transmission of speech through the base station BS to the mobile station MSA. When the MSB subscriber terminates the call transaction, he releases the pressel, whereby the MSB sends an end-of-transmission message U TX CEASED to the base station BS. The call control computer subsequently de-allocates the traffic channel concerned and sends an end-of-transmission message D TX CEASED to both parties MSA and MSB, whereby MSA and MSB go back onto a control channel. One successful call transaction I has thus been completed.

Figure 3:
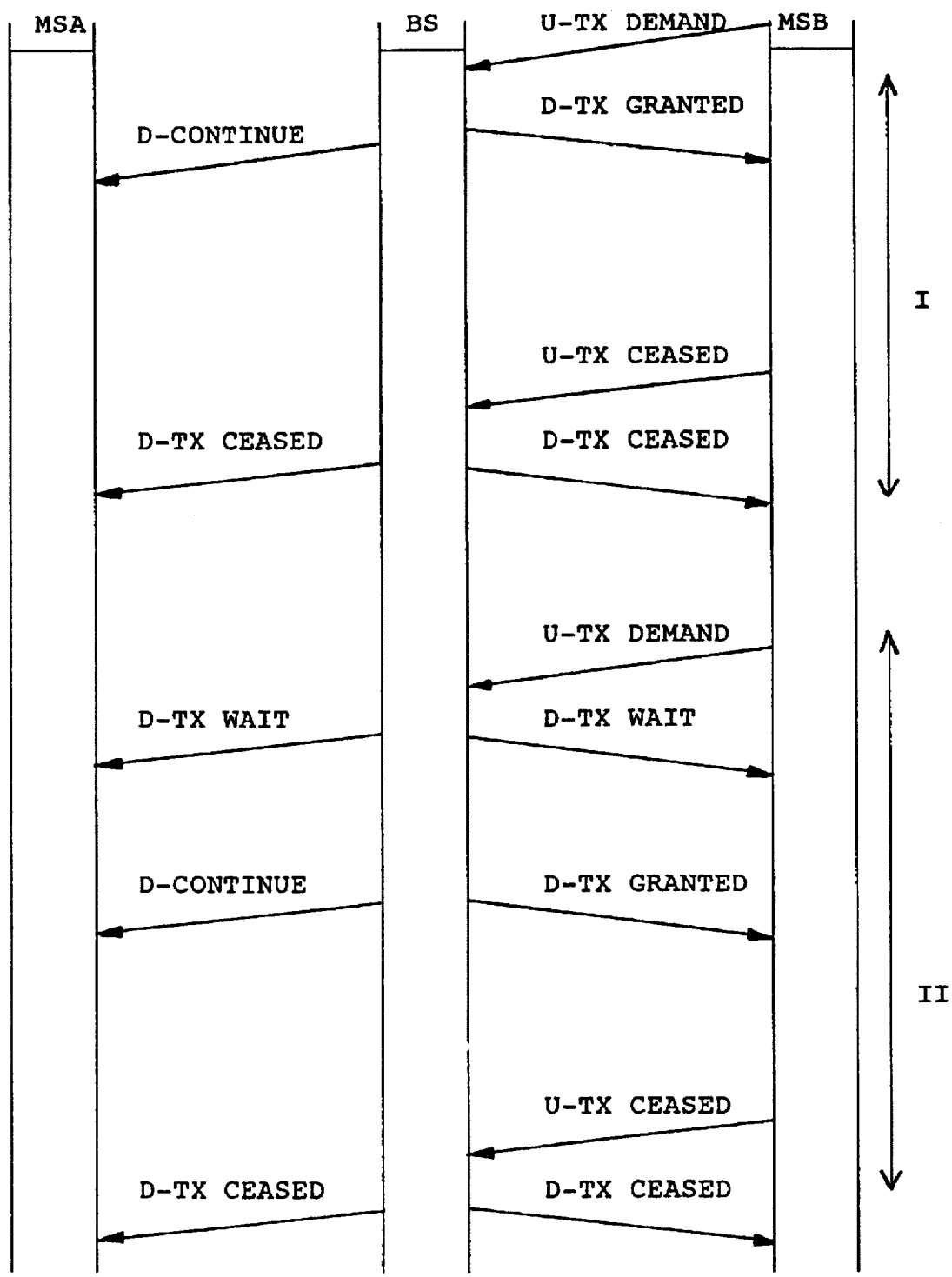
FIG. 3 shows a signalling scheme illustrating a transmission trunking procedure.

In FIG. 3, the MSB user wants to continue the call and presses the pressel, whereby the MSB sends a new request-to-transmit message U TX DEMAND. However, the call control computer of the mobile exchange MX has no free channels available at that moment, and so the MX puts the request in a queue and sends a D-TX WAIT message through the base station BS to the calling parties MSA and MSB on a control channel. When a traffic channel is then freed, the MX allocates it for a call and sends D-TX GRANTED and D-CONTINUE messages to the mobile stations MSA and MSB in the above manner. The MSB and MSA then go onto the traffic channel allocated to them for speech transmission. When the pressel is released, the MSB sends an end-of-transmission message U-TX CEASED, whereby the channel is de-allocated as described in connection with call transaction I. Another successful call transaction II in which the MSB has had to queue for channel resources has thus been completed.

A call may be made of a plurality of call transactions of the type described above, either one of the calling parties MSA and MSB initiating said transactions. When the parties want to terminate a call, they initiate a conventional call release procedure.

As stated above, a certain number M of transmission trunking traffic channels may be simultaneously allocated for a larger number of calls. The problem is that there is no guarantee that free traffic channels can be found and that a subscriber can be served at the precise moment he wants to. Another problem with the optimisation of the number of channels is that it is not necessarily possible to make a very reliable estimate of the highest level of traffic allowed since situations may vary from day to day depending on the users of the system. In the invention the radio system collects collision data of call transactions; on the basis of these data the radio system then defines the maximum number of simultaneous calls allowable in a given situation. The condition for this is that the system is capable of estimating fairly reliably when a collision has occurred. For example, in a system following the procedure of FIG. 3, in which a mobile station MS requests a traffic channel for each call transaction, every situation in which a traffic channel cannot be allocated immediately may be regarded as a collision. For example, in FIG. 3 the call in call transaction II has to queue for resources (traffic channel) since each traffic channel is allocated for call transactions of simultaneous calls, i.e. a collision has occurred.

Depending on the system, other suitable methods may also be applied to detect a collision/congestion of calls.

The system adjusts the number of simultaneous calls on the basis of the collected traffic and collision data. If the number or frequency of collisions increases, the maximum number of simultaneously allowable calls is reduced. If no collisions occur, the system increases the number of simultaneous calls. The maximum number of calls may also change with the ratio of such channel allocation attempts which have caused collisions to the total number of allocation attempts within a certain period of time.

Figure 4:
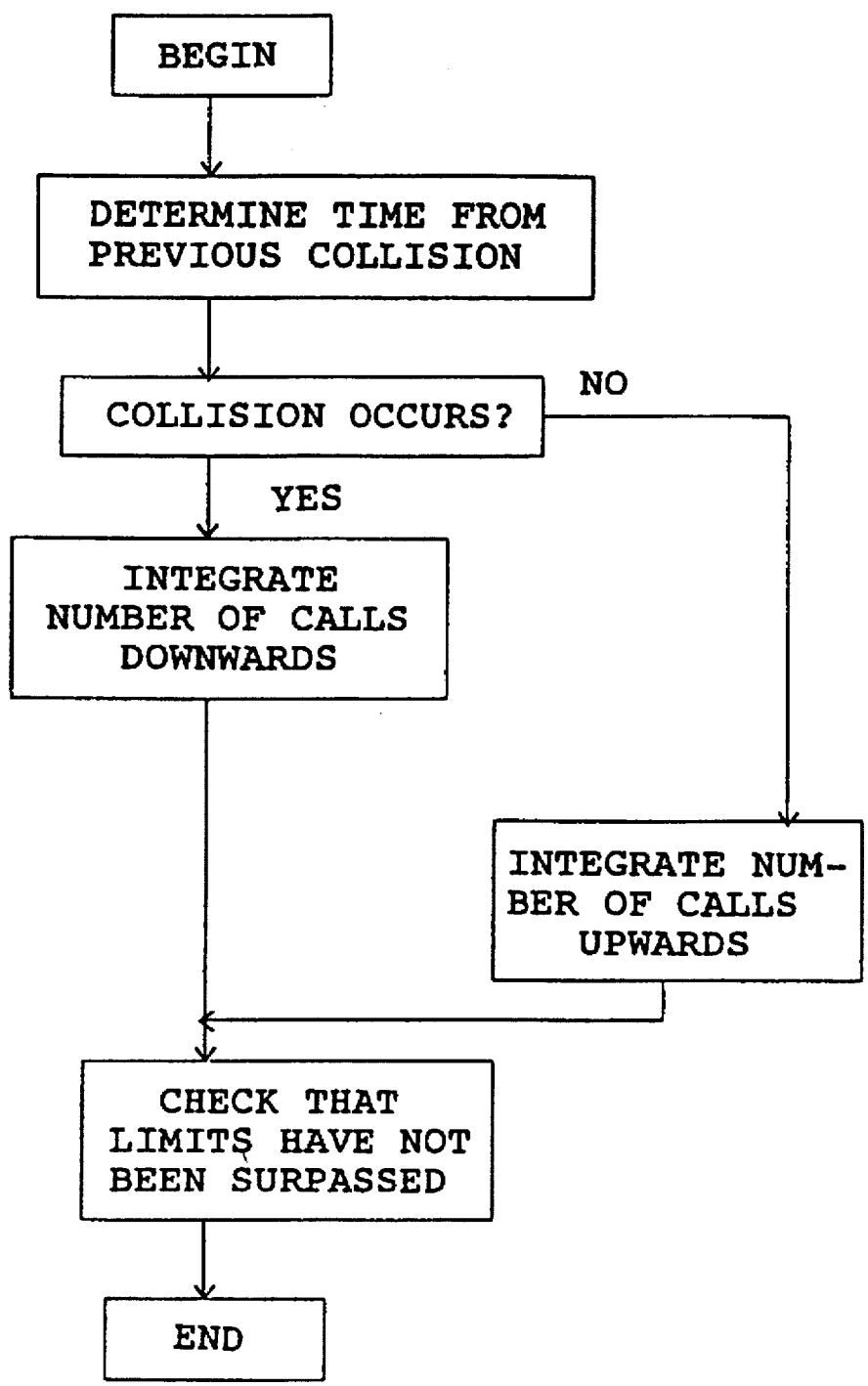
FIG. 4 is a flow diagram of one optimisation algorithm according to the invention.

FIG. 4 shows an algorithm for the optimisation of the number of calls. The algorithm is always initiated when a new channel allocation attempt is made. In the embodiment of FIG. 3, this means that a U-TX DEMAND message is sent. First the time from the previous collision is calculated or measured. It is then checked whether the channel allocation attempt was immediately successful or whether resources had to be queued for on account of collision. If there is no collision, the number of allowable calls is integrated upward by an integration constant selected by the operator. In case of collision, the maximum number of allowable calls is integrated downward. It is then checked that the integration result does not go beyond certain limits set to the radio system. The limits may be due to limitations inherent in the radio system (e.g. the radio system may have only five bits for identification of calls; i.e. a maximum of 32 calls), or a lower limit set by the operator. The integration result is then used as the new maximum number until the following integration. It is advantageous to the operation of the radio system that the control algorithm is integrative (contains a certain time constant). Without integration, e.g. when the traffic load is low, even a large number of calls may cause few collisions or none at all, whereby the maximum number of calls allowed rises high. If the amount of traffic then increases abruptly due to increase in call activity, the result is a large number of failed call transactions on account of too numerous calls.

In a fixed network, collection of data and calculation associated with optimisation according to the invention may be included in the operation of any component of the network, such as a mobile exchange or a base station, but most advantageously of a call control computer located in the mobile exchange MX, the computer controlling channel allocation and all signalling associated with call control.

Figure 2:
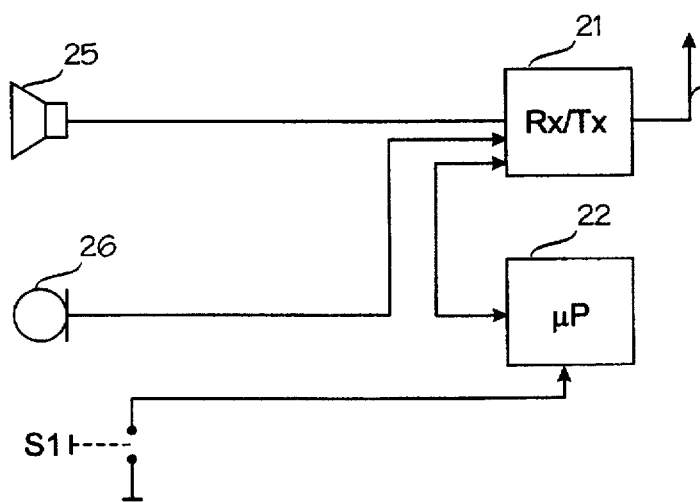
FIG. 2 shows a general block diagram of a mobile station.

The mobile station MS may be of any type, depending on the radio system. FIG. 2 shows a general block diagram of subscriber equipment MS in which the invention may be applied. The MS comprises a transceiver 21 connected to an antenna 27, the receiver being connected to a loudspeaker 25 and the transmitter being connected to a microphone 26. The operation of the MS is controlled by a microprocessor 22, which processes the signals transmitted and received by the transceiver 21. The subscriber equipment MS also comprises a pressel S1, or a switch, which the speaker activates (closes) as he speaks. The microprocessor 22 detects that the pressel S1 is activated and starts the above-described operations to perform a call transaction. On detecting the release of the pressel S1, the microprocessor 22 starts the above operations to terminate the call transaction.

The attached figures and the description thereof are intended only to illustrate the present invention. The call control method and radio system according to the invention may vary in their details within the scope and spirit of the attached claims.

I claim:

1. A call control method in a transmission trunking radio system, comprising the steps of:
   sharing M traffic channels by simultaneous on-going calls of N mobile stations in maximum according to a transmission trunking method, N and M being positive integers and N>M;
   requesting traffic channel for each call transaction by said mobile stations via a control channel during said calls;
   allocating to any one of said N mobile stations requesting a traffic channel any one of said M traffic channels, if available, for a duration of a call transaction, and deallocating said traffic channel and commanding said one mobile station to return onto said control channel after completion of said call transaction;
   registering collision of call transactions, if the radio system, due to a lack of available traffic channels, fails to immediately allocate any one of said M traffic channels to any one of said N mobile stations requesting a traffic channel;
   collecting data about collisions of call transactions of different calls on said M traffic channels; and
   automatically adjusting the allowed maximum number N of simultaneous calls in accordance with the collected data.

2. The method of claim 1, further comprising the steps of:
   initiating the call transaction by activating a pressel in the mobile station; and
   terminating the call transaction by releasing the pressel in the mobile station.

3. The method of claim 1, further comprising the step of:
   adjusting the allowed maximum number N of simultaneous calls in accordance with the number of collisions of call transactions.

4. The method of claim 3, further comprising the step of:
   adjusting the allowed maximum number N of simultaneous calls in accordance with the frequency of collisions of call transactions.

5. The method of claim 3 further comprising the step of:
   adjusting the allowed maximum number N of simultaneous calls in accordance with a ratio of such channel allocation attempts which have caused collisions to the total number of allocation attempts in a time unit.

6. The method of claim 1, further comprising the step of:
   adjusting the allowed maximum number N of simultaneous calls in accordance with the frequency of collisions of call transactions.

7. The method of claim 6, further comprising the step of:
   adjusting the allowed maximum number N of simultaneous calls in accordance with the ratio of such channel allocation attempts which have caused collisions to a total number of allocation attempts in a time unit.

8. The method of claim 1, further comprising the step of:
   adjusting the allowed maximum number N of simultaneous calls in accordance with a ratio of such channel allocation attempts which have caused collisions to the total number of allocation attempts in a time unit.

9. The method of claim 1, wherein said step of adjusting comprises, in connection with every channel allocation attempt, the further steps of:
   measuring a time elapsed since a previous collision;
   integrating the maximum number N of simultaneous calls downwards if the allocation attempt causes collision of call transactions; and
   integrating the maximum number N of simultaneous calls upwards if the allocation does not cause collision of call transactions.

10. Transmission trunking radio system, comprising:
   a plurality of base station sites;
   a plurality of mobile stations;
   at least one of said base station sites having at least one control channel and at least M traffic channels for shared use of simultaneous on-going calls of N mobile stations in maximum according to a transmission trunking method, N and M being positive integers and N>M;
   said N mobile stations being arranged to request traffic channel for each call transaction via said control channel during said calls;
   a call control unit arranged to allocate to any one of said N mobile stations requesting a traffic channel any one of said M traffic channels, if available, for a duration of a call transaction, and to deallocate said traffic channel and to command said one mobile station to return onto said control channel after completion of said call transaction;
   means for collecting data on collisions of call transactions of different calls on said M traffic channels, a collision of call transactions being detected, if said call control unit, due to a lack of available traffic channels, fails to immediately allocate any one of said M traffic channels to any one of said N mobile stations requesting a traffic channel; and means for automatically adjusting the allowed maximum number of simultaneous calls in accordance with the collected data.

* * * * *